United States Patent Office 3,297,517
Patented Jan. 10, 1967

3,297,517
MANUFACTURE OF MINERAL FIBERBOARD
John E. Cadotte, St. Paul, Minn., assignor to Wood Conversion Company, St. Paul, Minn., a corporation of Delaware
No Drawing. Filed Apr. 7, 1966, Ser. No. 540,808
10 Claims. (Cl. 162—145)

This application is a continuation-in-part of my copending application Serial No. 427,545, filed January 25, 1965, as a continuation-in-part of the now abandoned application Serial No. 193,299, filed May 8, 1962 now abandoned, as a continuation-in-part of Serial No. 149,199, filed November 1, 1961, now abandoned.

The present invention relates to mineral fiberboard and to improved formulations for making the same.

Mineral fiberboard is of commercial value, compared to vegetable fiberboard, because of the incombustibility of the mineral fiber. Although it is known to incorporate some vegetable fibers in a mineral fiberboard, this is not done where a high fire rating is desired.

Numerous forms of tile or panels of fire-resistant mineral fiberboard have tongues and grooves for mounting the same. Low strength and a relatively low hardness of the body material leads to weak tongues and groove side walls.

It is the general object of the present invention to produce mineral fiberboard with improved hardness and strength.

It is a particular object of the invention to incorporate into the body material for the board a colloidal form of asbestos.

It is also an object of the invention to flocculate a slurry of mineral fiber, starch binder and colloidal asbestos, with or without an appreciable content of natural clay, for dewatering it in forming a wet mat to be dried and bonded to board form.

Heretofore, in aqueous slurries, asbestos fibers have been used in making mineral fiberboard, when starch grains are present to serve as binder. The asbestos fibers not only augment the non-combustible synthetic mineral fiber, such as slag wool, but they render the slurry suitably viscous to aid in the retention of starch grains in dewatering the slurry. This is explained in U.S. Patent No. 3,093,533, describing fire-retardant mineral fiberboard with or without a small proportion of cellulosic fibers. Said patent also explains that starch grains in the wet mat formed by dewatering the slurry are gelatinized in the wet mat prior to drying the mat to effect the starch bond.

It is axiomatic in the industry that the longer the fibers used in forming fiberboard, the stronger is the board. Hence, it would follow that in using asbestos fibers length is desirable.

However, the present invention is based upon the discovery that when the asbestos fibers are shortened to colloidal dimensions, new and unexpected results are achieved, including increased rather than expected decreased strength. The form of the colloidal asbestos imparts to it new functions not observed with feltable asbestos fibers. There are two kinds of asbestos fibers commonly employed in combination with synthetic mineral fibers, these being known as amosite and chrysotile. Chrysotile is distinctive in that it is readily milled mechanically in water to its innate fibrils of colloidal dimensions. California chrysotile asbestos has the formula $Mg(OH)_8Si_4O_{10}$. Its fibrils have diameters in the range from 250 to 350 Angstrom units, or 0.025–0.035 micron.

Amosite asbestos is much harder, more "rocky" and less easily milled. However, given sufficient time it can be milled to colloidal dimensions and in the present invention its colloidal form functions substantially the same as colloidal chrysotile asbestos.

It is known to include considerable natural clay, such as bentonite and kaolin, in fiberboard of which the fibers are substantially entirely synthetic mineral fibers, such as rock wool and slag wool, when high fire-rating is desired. When clay is so used in a slurry to be dewatered much of it can be lost in the white water, unless prevented. One way to prevent such loss is to flocculate the solids of an aqueous slurry by adding a surface-active flocculating agent, as described in my copending application Serial No. 427,545. A suitable one is a polyacrylamide flocculating agent which is highly effective in small amounts. As a result there is a practice of using polyacrylamide to flocculate by addition of polyacrylamide a slurry such as one consisting essentially of feltable fibers predominating in synthetic mineral fibers, starch as raw grains or as cooked starch, or as a mixture thereof, and natural clay, such as bentonite or kaolin. Flocs so formed include the fibers, the starch (raw or cooked), and the clay.

As disclosed in said Patent No. 3,093,533, the asbestos fibers aid in retention of starch in the absence of flocculation. When clay is introduced into the formulation, flocculation is practiced, thus to aid in retention of both clay and starch. Flocculation eliminates the need for using asbestos fibers for its thickening function.

In experimenting with colloidal asbestos, and with a formulation of slag wool and starch grains, comparisons were made using chrysotile asbestos (1) as fibers in Example 1, (2) as colloid in Example 2, and (3) again in Example 3 as colloid with the additional use of flocculation. Panels were formed by dewatering, gelatinizing the starch grains in the wet mat and drying, and in only Example 3 by flocculating before dewatering. The properties were then determined in comparison as set forth in Table I.

TABLE I

| Example | Parts by Weight | | |
|---|---|---|---|
| | 1 | 2 | 3 |
| Slag wool | 79.6 | 79.6 | 79.6 |
| Chrysotile fibers | 2.7 | | |
| Chrysotile colloid | | 2.7 | 2.7 |
| Starch grains | 17 | 17 | 17 |
| Polyacrylamide | | | 0.03 |
| Density (lbs./cu. ft.) | 18.4 | 19.3 | 21.0 |
| Hardness in pounds [1] | 99 | 143 | 198 |
| Modulus of rupture [2] | 215 | 333 | 407 |
| Ratio M/R to density | 11.6 | 17.2 | 19.4 |

[1] Force required to drive a two inch diameter ball to a depth of ¼ inch.
[2] M/R in pounds per square inch.

The axiomatic expectation that shortening the asbestos fibers of Example 1 to colloidal form as in Example 2 would lower the strength turns out to be contrary, and in fact greater strength is achieved. When a combination of colloidal asbestos and flocculation is used, a still greater increase in strength is found. With the said increases in strength, the hardness is generally increased.

These results have led to investigating what may be taking place. It is known that the mineral asbestos has a positive or cationic charge. The high specific surface of the fibrils in colloidal form causes an aqueous dispersion of them to exhibit high cationic activity and the small sizes to have great mobility compared to the same material in its feltable fiber form.

Under the microscope it has been observed that when mineral wool fibers and starch grains are suspended in water, there is no evidence of a mutual attraction between them. However, when colloidal asbestos is also present, it exhibits an attraction for both the mineral wool fibers and the starch grains, resulting in clumping of the starch grains at the fibers rather than remaining isolated from the fibers.

Thus, it is postulated that the starch and the asbestos are brought closer to the fibers and that both function as binder to give greater strength and hardness. When flocculation is also practiced, these effects are enhanced by concentration of the solids in flocs.

To show that the effects are not limited to colloidal chrysotile the following comparisons are made with amosite asbestos:

TABLE II

| Example | Parts by Weight | |
|---|---|---|
| | 4 | 5 |
| Slag wool | 79.6 | 79.6 |
| Amosite fibers | 2.7 | |
| Colloidal amosite | | 2.7 |
| Starch grains | 17.0 | 17.0 |
| Polyacrylamide | .03 | .03 |
| Density | 18.6 | 18.8 |
| Hardness | 130 | 178 |
| Modulus of rupture (M/R) | 274 | 348 |
| Ratio of M/R to density | 14.7 | 18.5 |

Here again the expectation that shortening of the fibers as in Example 5 would lower the strength turns out to be contrary and in fact greater strength is achieved. It also shows that colloidal amosite has the same cationic character as does colloidal chrysotile.

The invention is not limited to the use of starch as grains, as shown by the following comparisons in Table III using cooked starch.

TABLE III

| Example | Parts by Weight | |
|---|---|---|
| | 6 | 7 |
| Slag wool | 83.8 | 83.8 |
| Amosite fibers | | 2.8 |
| Chrysotile colloid | 2.8 | |
| Cooked starch | 12.6 | 12.6 |
| Polyacrylamide | .03 | .03 |
| Density (pounds per cu. ft.) | 16.5 | 17.1 |
| Hardness | 55 | 49 |
| Modulus of rupture (M/R) | 205 | 156 |
| Ratio M/R to density | 12.5 | 9.1 |

The presence of natural clay, such as kaolin, ball clay or bentonite, seems to give greater strength and hardness in spite of using less starch, lowered starch being most desirable to lessen the content of combustible matter. The following Table IV illustrates:

TABLE IV

| Example | Parts by Weight | |
|---|---|---|
| | 8 | 9 |
| Slag wool | 98 | 98 |
| Amosite fibers | 2 | |
| Chrysotile colloid | | 2 |
| Starch grains | 12 | 12 |
| Phenolic resin | 0.6 | 0.6 |
| Kaolin clay | 20 | 20 |
| Polyacrylamide | .03 | .03 |
| Density (pounds per cu. ft.) | 22 | 21.8 |
| Hardness (pounds) | 140 | 150 |
| Modulus of rupture (M/R) | 295 | 354 |
| Ratio M/R to density | 13.4 | 16. |

In view of the greater strength obtainable by use of colloidal asbestos, such ultimate strength may be lowered by reducing the content of starch for panels to have a higher fire rating. Ordinarily, the reduction in starch will lower the strength, but this can be safely done by including in the slurry colloidal asbestos in compensation.

In retrospect, it appears that the mutual attraction of a particle of colloidal asbestos for starch and for the mineral wool, makes said particle a linking agent, drawing more starch to the wool than exists normally in the absence of colloidal asbestos. Thus, the binding effect of a given proportion of starch is increased by the presence of small amounts of colloidal asbestos.

Although the preferred forms of the invention are those in which all the fibers are mineral fibers, the invention is not so limited. The presence of cellulosic fibers in the slurry does not negative the function of the colloidal asbestos, as shown by the following examples in Table V.

TABLE V

| Example | Parts by Weight | | |
|---|---|---|---|
| | 10 | 11 | 12 |
| Slag wool | 96.5 | 95.5 | 92.5 |
| Chrysotile colloid | 3.5 | 3.5 | 3.5 |
| Cellulose fibers | None | 1.0 | 4.0 |
| Starch grains | 20 | 20 | 20 |
| Polyacrylamide | 0.035 | .035 | 0.035 |
| Density (pounds per cu. ft.) | 19.3 | 19.3 | 19.1 |
| Hardness (pounds) | 182 | 185 | 178 |
| Modulus of rupture (M/R) | 359 | 354 | 365 |
| Ratio of M/R to density | 18.6 | 18.4 | 19.0 |

From the foregoing it will be seen that the invention permits improvements in mineral fiber panels which may or not contain some vegetable fibers, as set forth in the appended claims.

I claim:

1. The method comprising forming an aqueous slurry comprising essentially feltable fibers predominating in synthetic mineral fibers, binder selected from the group consisting of cooked starch, raw starch, and a mixture thereof, and a small quantity of colloidal asbestos, dewatering the resulting suspension of flocs and thereby forming a wet mineral fiber felt, and drying the resulting felt under conditions effecting bonding of the fibers by the dried residue of starch gel.

2. The method of claim 1 in which the feltable fibers consist of synthetic mineral fibers.

3. The method of claim 1 in which the asbestos is colloidal chrysotile asbestos.

4. The method of claim 1 in which the starch is raw starch.

5. The method of claim 1 in which the slurry is flocculated by adding a surface-active flocculating agent.

6. The method of claim 5 in which said agent is polyacrylamide.

7. The method comprising forming an aqueous slurry comprising essentially feltable fibers predominating in synthetic mineral fibers, natural clay, binder selected from the group consisting of cooked starch, raw starch, and a mixture thereof, and a small quantity of colloidal asbestos, forming flocs of the solids of said slurry by adding thereto a surface-active flocculating agent, dewatering the resulting suspension of flocs and thereby forming a wet mineral fiber felt containing said clay, and drying the resulting felt under conditions effecting bonding of the fibers and of the clay by the dried residue of starch gel.

8. The method of claim 7 in which the starch is raw starch.

9. The product of the process of claim 1.

10. The product of the process of claim 7.

References Cited by the Examiner

UNITED STATES PATENTS

| | | | |
|---|---|---|---|
| 2,717,830 | 9/1955 | Bjorkman | 162—145 |
| 2,962,415 | 11/1960 | Arledter | 162—145 |
| 3,062,701 | 11/1962 | Novak | 162—145 |
| 3,093,533 | 6/1963 | Hella et al. | 162—145 |
| 3,146,156 | 8/1964 | Cadotte | 162—145 X |
| 3,184,372 | 5/1965 | Cotts | 162—145 |
| 3,250,633 | 5/1966 | Cotts | 162—145 X |

DONALL H. SYLVESTER, *Primary Examiner.*

H. CAINE, *Assistant Examiner.*